(12) United States Patent
Good (10) Patent No.: US 8,118,228 B2
(45) Date of Patent: Feb. 21, 2012

(54) LASER SCANNER OUTPUT WINDOW

(75) Inventor: Timothy A. Good, Clementon, NJ (US)

(73) Assignee: Metrologic Instruments, inc., Blackwood, NJ (US)

( * ) Notice: Subject to any disclaimer, the term of this patent is extended or adjusted under 35 U.S.C. 154(b) by 223 days.

(21) Appl. No.: 12/420,880

(22) Filed: Apr. 9, 2009

(65) Prior Publication Data
US 2010/0258632 A1  Oct. 14, 2010

(51) Int. Cl.
*G06K 7/10* (2006.01)
(52) U.S. Cl. .............. 235/472.01; 235/454; 235/462.01; 235/462.43; 235/462.45
(58) Field of Classification Search .................. 235/435, 235/439, 454, 462.01, 462.32, 462.43, 462.45, 235/472.01
See application file for complete search history.

(56) References Cited

U.S. PATENT DOCUMENTS

| | | | |
|---|---|---|---|
| 4,409,470 A | 10/1983 | Shepard et al. | |
| 4,955,693 A | 9/1990 | Bobba | |
| 4,971,410 A | 11/1990 | Wike, Jr. et al. | |
| 4,983,818 A | 1/1991 | Knowles | |
| 5,164,584 A | 11/1992 | Wike, Jr. et al. | |
| 5,278,397 A | 1/1994 | Barkan et al. | |
| 5,288,984 A | 2/1994 | Ito et al. | |
| 5,340,973 A | 8/1994 | Knowles et al. | |
| 5,398,112 A * | 3/1995 | Ai et al. ......................... | 356/514 |
| 5,440,111 A | 8/1995 | Eastman et al. | |
| 5,440,142 A | 8/1995 | Maddox | |
| 5,581,068 A | 12/1996 | Shepard et al. | |
| 5,608,578 A | 3/1997 | Bunce et al. | |
| 5,629,510 A | 5/1997 | Quinn et al. | |
| 5,723,859 A | 3/1998 | Kerschner et al. | |
| 5,729,003 A | 3/1998 | Briggs | |
| 6,375,076 B1 | 4/1998 | Massieu et al. | |
| 5,774,253 A * | 6/1998 | Clune ......................... | 359/226.1 |
| 6,279,249 B1 | 8/2001 | Dao et al. | |
| 6,820,810 B2 | 11/2004 | Vinogradov et al. | |
| 6,981,643 B2 | 1/2006 | Tien | |
| 7,051,939 B2 * | 5/2006 | Hammer et al. ......... | 235/462.39 |
| 7,204,424 B2 | 4/2007 | Yavid et al. | |
| 7,221,399 B2 | 5/2007 | Fujita et al. | |
| 7,325,739 B2 | 2/2008 | Vinogradov et al. | |
| 2004/0009338 A1 | 1/2004 | Jo et al. | |
| 2007/0194119 A1* | 8/2007 | Vinogradov et al. ......... | 235/454 |
| 2008/0237349 A1 | 10/2008 | Urey et al. | |
| 2008/0245872 A1 | 10/2008 | Good | |

OTHER PUBLICATIONS

"IS4110 and IS4125 ScanQuest® Laser Scan Engine Installation and User's Guide", Metrologic Instruments, Inc., pp. i-29, (2006).

* cited by examiner

*Primary Examiner* — Thien M. Le
*Assistant Examiner* — April Taylor
(74) *Attorney, Agent, or Firm* — Thomas J. Perkowski, Esq., P.C.

(57) ABSTRACT

A laser scanner for reading symbology, such as barcodes. The laser scanner includes a housing, a laser source or generator disposed in the housing and operative to generate a laser beam, and an output window supported by housing and being positioned to receive the laser beam incident thereon. The window is operative to transmit the laser beam therethrough at a symbology target. In one embodiment, the window includes a vertical wedge angle between front and rear surfaces of the window that is oriented substantially in alignment with a vertical axis defined by the window. The vertical wedge angle is preferably oriented perpendicular to a horizontally-extending scanning line of the laser beam on the window. In one embodiment, the vertical wedge angle is substantially the same along the entire length or width of the window.

18 Claims, 8 Drawing Sheets

LASER SCANNER OUTPUT WINDOW

FIELD OF THE INVENTION

The present invention relates to symbology scanning systems, and more particularly to output windows for laser barcode scanners.

BACKGROUND

Barcode readers or scanners are found in many commercial environments such as, for example, point-of-sale (POS) stations in retail stores and supermarkets, inventory and document tracking, and diverse data control applications. To meet the growing demands, barcode symbol readers of various types have been developed for scanning and decoding barcode symbol patterns and producing symbol character data for use as input in automated data processing systems. Barcode scanners generally are available in hand-held, hands-free or in-counter formats.

Figure 4:
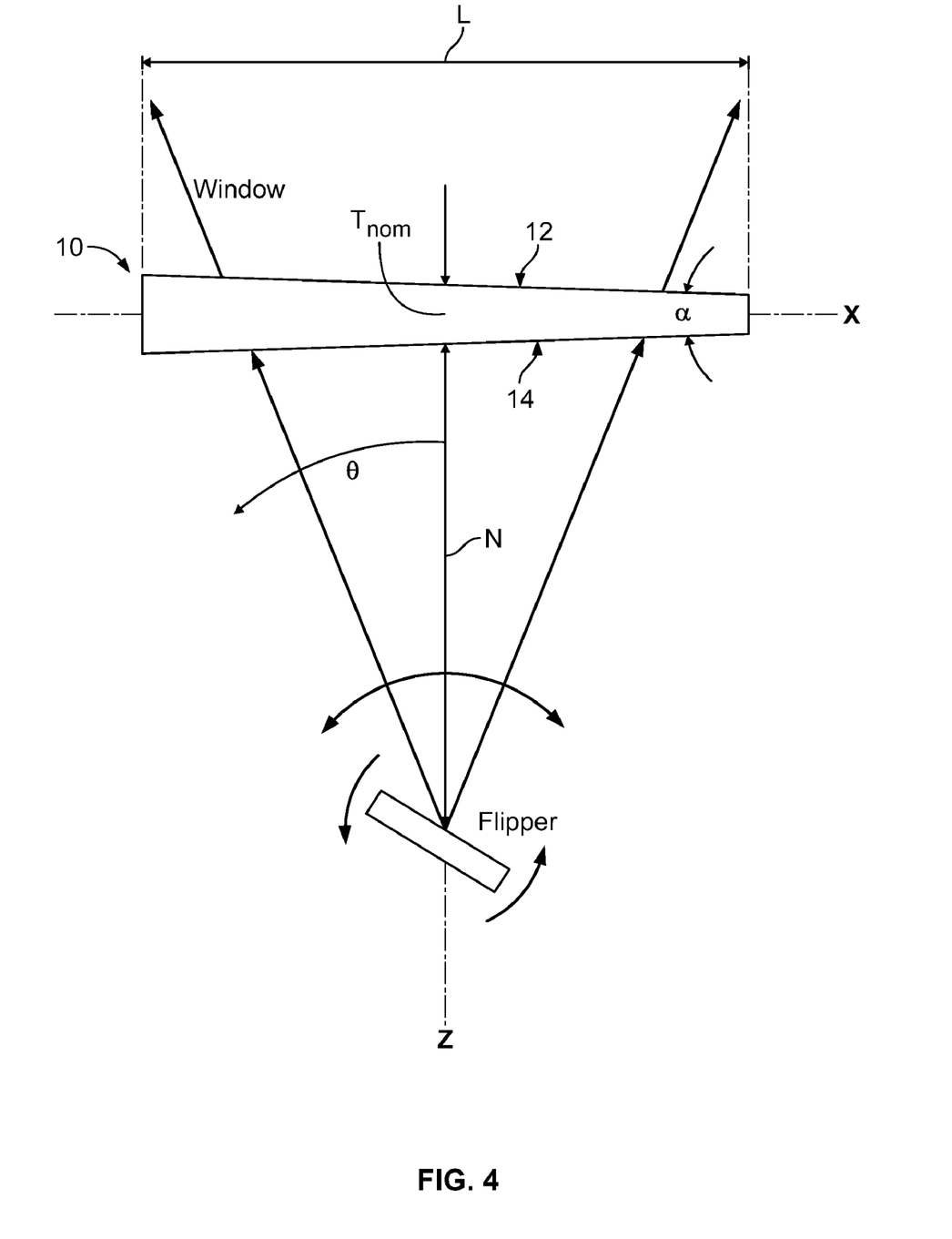
FIG. 4 is a top view of a laser output window of a laser barcode scanner having a horizontally-extending wedge angle.

Conventional laser barcode scanners generally include a laser generator such as a solid state visible laser diode (VLD) that generates a visible laser beam used for scanning and reading a barcode. The laser beam is directed at the target barcode through a laser output or exit lens or window made of an optically transparent material or medium such as plastic or glass. In some embodiments, the output windows may be tinted a color such as red as commonly used. The laser output windows are generally made by a molding process. The laser beam, which may be emitted by a laser diode housed within the scanner, is typically scanned or oscillated rapidly back and forth across the output window by some conventional means known in the art, such as a flipper as shown in FIG. 4. These scanners, referred to as "flying spot" laser scanners, moves or scans the laser beam leaving the output window across the entire barcode reflecting light back to a photodiode in the scanner that functions to measure the change in intensity of the reflected light by the alternating light and dark areas within the barcode. The photodiode generates a voltage waveform that is representative of the reflected light and the barcode being read. Decoding circuitry in the scanner interprets the voltage waveform to decode the barcode.

Figure 1:
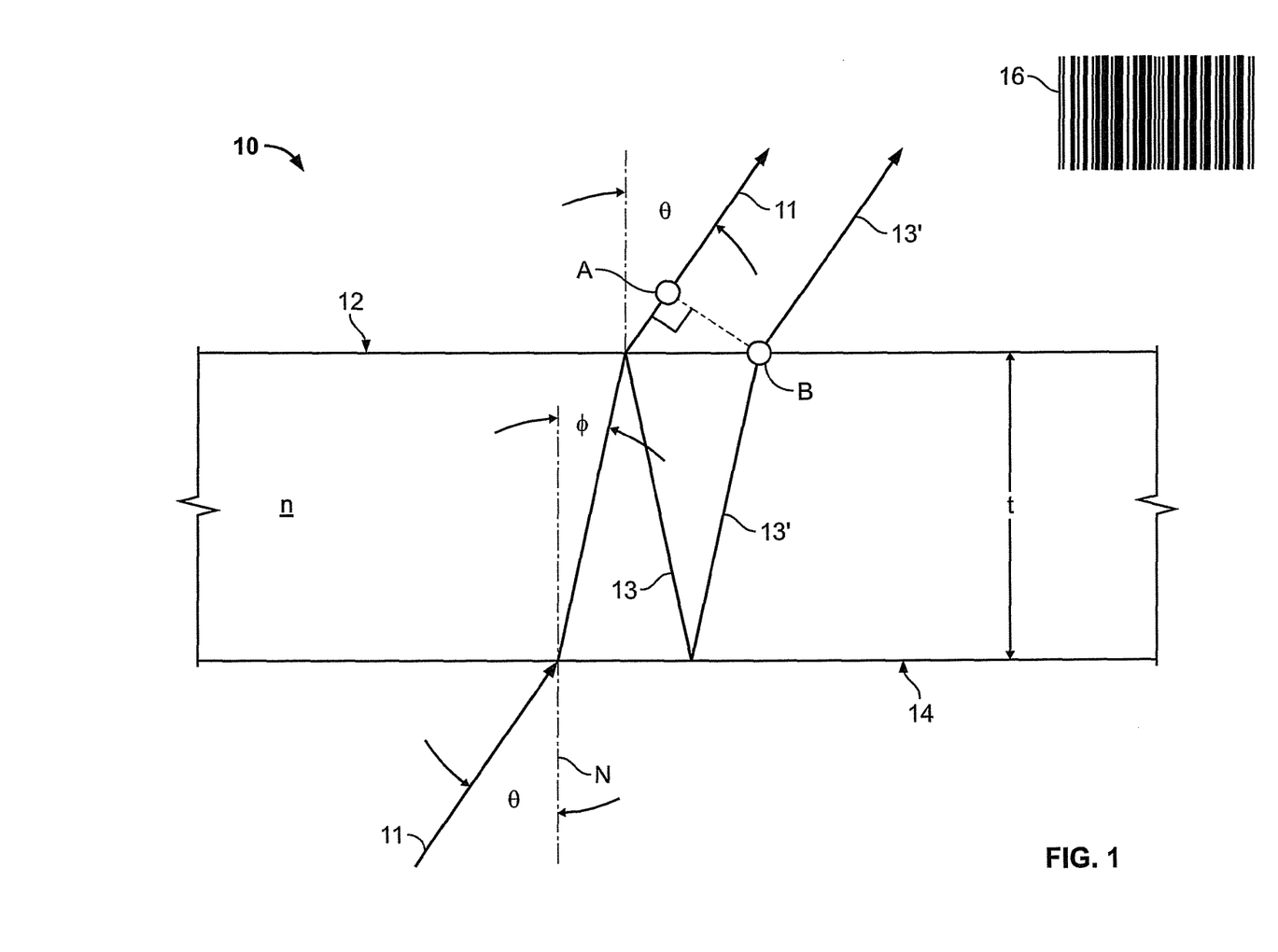
FIG. 1 is a top view of a laser output window of a laser barcode scanner.
Figure 5:
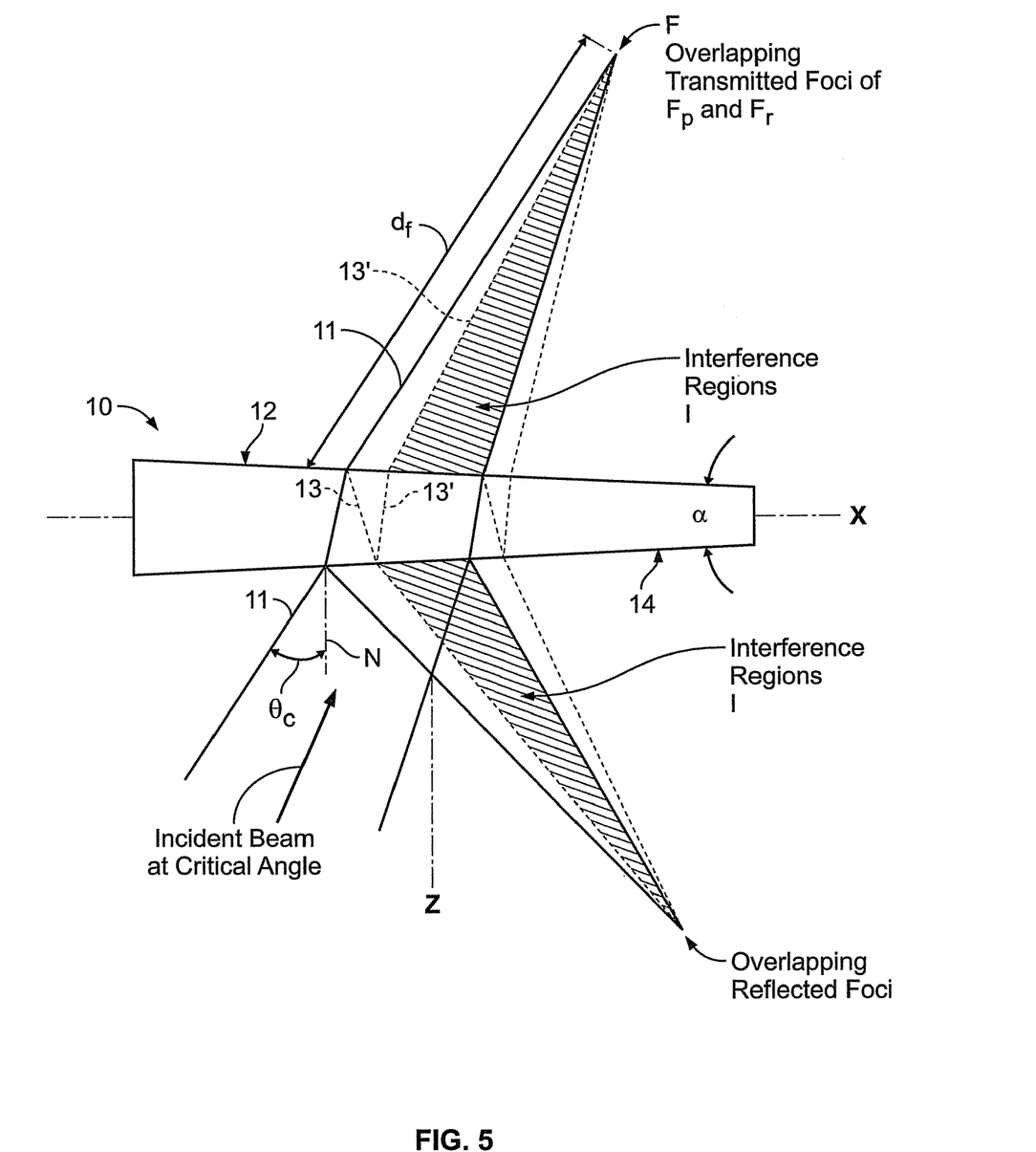
FIG. 5 is a top view of the laser output window of FIG. 4 showing primary and reflected laser beams.

FIG. 1 depicts a laser output window 10 of a laser scanner including a front surface 12 (e.g. external) and rear surface 14 (e.g. internal) arranged in substantially parallel relationship to each other. The material or medium used in window 10 has an associated refractive index "n" and a nominal thickness "t." When a roughly collimated or focused primary laser beam 11 is transmitted in a first propagation direction from the laser diode through a conventional laser output window 10, the beam 11 strikes the window at an angle of incidence $\theta$ and is refracted at an angle of refraction $\phi$ after the beam penetrates the window medium. Low-power secondary laser beam reflections typically occur at both the front and rear surfaces 12, 14 of the window. The first of these reflected laser beams 13, which occurs at the interface of the front surface 12 of window 10 where the primary beam 11 leaves the output window medium and re-enters air, travels rearward back through the window and reencounters the rear surface 14 of the output window 10. Some of first reflected laser beam 13 continues to travel rearward back into the scanner leaving window 10 along with a small portion of primary laser beam 11 which is reflected rearward from rear surface 14 as shown in FIG. 5. A very small amount of the first reflected laser beam 13, however, is reflected in an opposite forward direction again forming a second reflected laser beam 13' traveling in the forward propagation direction of the primary laser beam 11. Most of the second reflected laser beam 13' leaves front surface 12 of the laser output window 10 and roughly follows along substantially in parallel with the primary beam 11 towards the barcode 16 target. The primary and second reflected laser beams 11, 13' are separated by a distance measured between points A and B as shown in FIG. 1 and result in an optical path difference (OPD) wherein the distance traversed by beams 11 and 13' at points A and B are different even though the two beams originated at the same front surface 12 of laser output window 10.

In certain instances, some "flying spot" laser barcode scanners have randomly encountered problems accurately reading the barcode while other scanners of the same design and configuration have not been susceptible to these problems. As further described herein in the Detailed Description section, the barcode reading accuracy problems have been attributed to optical signal noise caused by the primary and second reflected laser beams 11 and 13', respectively. An improved laser output window is therefore desired that minimizes or eliminates these apparently random scanner barcode reading problems.

SUMMARY

A laser scanner for reading symbologies such as barcodes is provided that minimizes or eliminates the foregoing signal noise problem in known scanners.

According to one embodiment, a laser scanner for reading symbology includes: a housing; a laser generator disposed in the housing and operative to generate a laser beam; an output window supported by housing and being positioned to receive the laser beam, the window defining vertical and horizontal axes and being operative to transmit the laser beam therethrough at a symbology target. The window includes a vertical wedge angle between front and rear surfaces of the window for avoiding signal noise; the vertical wedge angle being oriented substantially parallel to the vertical axis. In one embodiment, the vertical wedge angle is substantially the same or uniform along the entire length or width of the window.

According to another embodiment, a laser scanner for reading symbology includes: a housing; a laser generator disposed in the housing and operative to generate a laser beam; an output window supported by the housing and being positioned to receive the laser beam incident thereon, the window defining vertical and horizontal axes and being operative to transmit the laser beam therethrough at a symbology target, the window having a height and a length or width. The output window includes a vertical wedge angle between front and rear surfaces of the window for avoiding signal noise; the vertical wedge angle being oriented substantially parallel to the vertical axis along substantially an entire width or length of the output window. In one embodiment, the laser scanner includes a means for scanning the laser beam across the rear surface of the window to define a horizontally-extending scanning line thereon. Preferably, in one embodiment, the vertical wedge angle is oriented in a direction substantially perpendicular to the scanning line.

According to another embodiment, a laser scanner for reading symbology includes: a housing; a laser generator disposed in the housing and operative to generate a primary laser beam; an optically-transparent output window supported by the housing and operative to transmit the laser beam therethrough at a symbology target, the window having a height and a length or width; and a means for scanning the laser beam back and forth across the length or width of the window thereby defining a scanning line. The window includes a vertical wedge angle between front and rear surfaces of the window for avoiding signal noise, the vertical wedge angle being oriented substantially perpendicular to the scanning line. In one embodiment, the vertical wedge angle extends horizontally across substantially the entire width or length of the output window. In some preferably embodiments, the laser scanner housing is configured to be a handheld, portable scanner.

BRIEF DESCRIPTION OF THE DRAWINGS

The features of the preferred embodiments will be described with reference to the following drawings where like elements are labeled similarly, and in which.

All drawings are schematic and are not drawn to scale.

DETAILED DESCRIPTION

This description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation. Terms such as "attached," "affixed," "connected" and "interconnected," refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the preferred embodiments. Accordingly, the invention expressly should not be limited to such preferred embodiments illustrating some possible non-limiting combination of features that may exist alone or in other combinations of features; the scope of the invention being defined by the claims appended hereto.

Investigation and Testing

Investigation and analysis of anomalous barcode reading problems encountered with some "flying spot" laser scanners as discussed in the Background of Invention section of the present application was undertaken by the inventor. The scanner units investigated had horizontally-elongated laser output windows (i.e. orientation based on when the scanner is held upright) and thus are longer in length L or width W and shorter in vertical height H (see, e.g. FIG. 6).

In flying spot laser barcode scanners, a primary laser beam 11 generated by a laser light source is scanned or oscillated rapidly from side to side (i.e. lengthwise or width-wise) across the laser output window 10 (as described above and illustrated in FIG. 4), which in turn travels through the window medium before being projected onto a barcode 16 target. As the laser sweeps across the laser output window 11, if certain geometric conditions are apparently met by the window, the interference effect between the primary transmitted beam 11 and secondary reflected beam 13' pulsates rapidly between constructive and destructive interference, creating very significant optical noise in the signal which adversely affects accurate decoding of the barcode 16.

Figure 2:
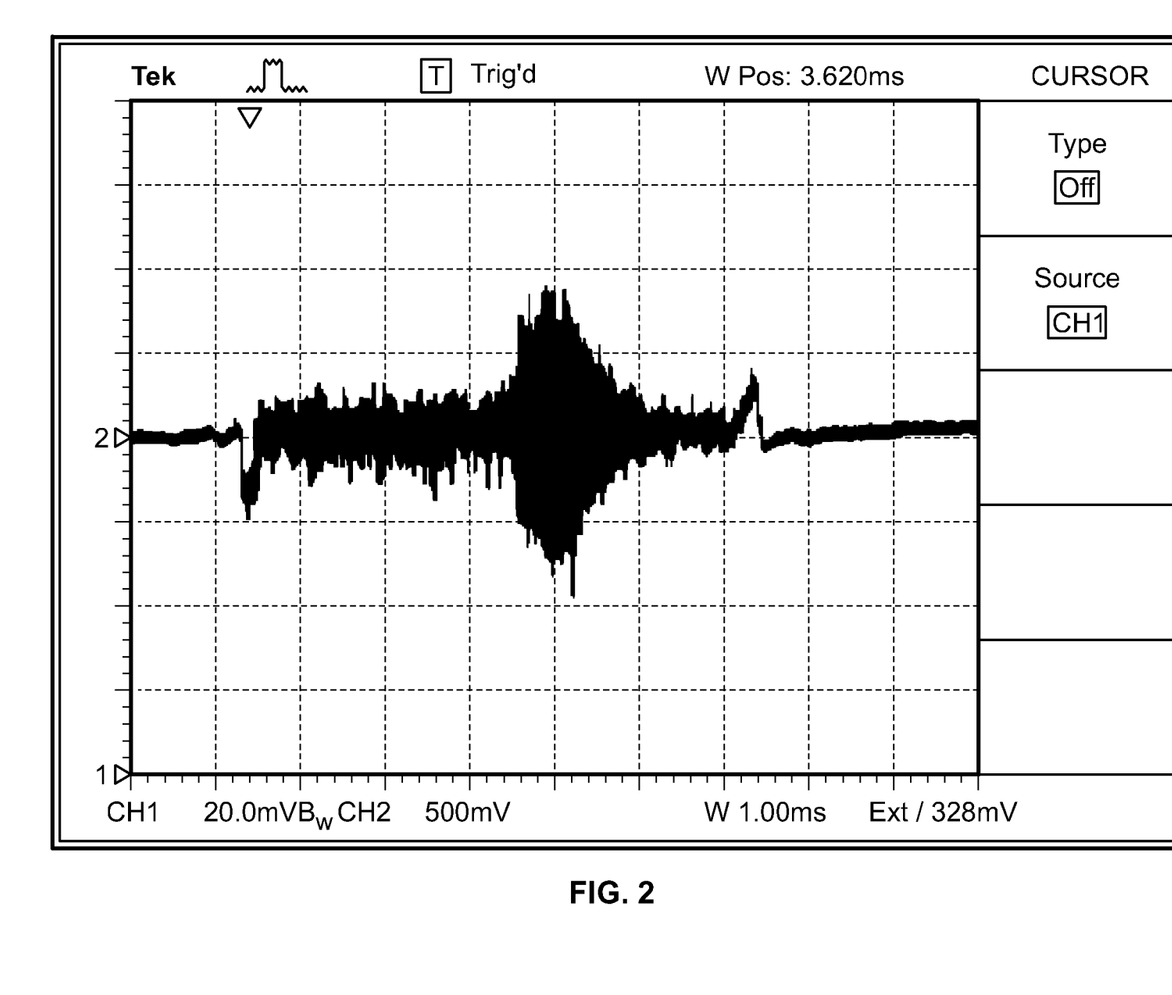
FIG. 2 is a display screen of a frequency measurement instrument showing noise of the 1st derivative of a signal detected by a laser barcode scanner.
Figure 3:
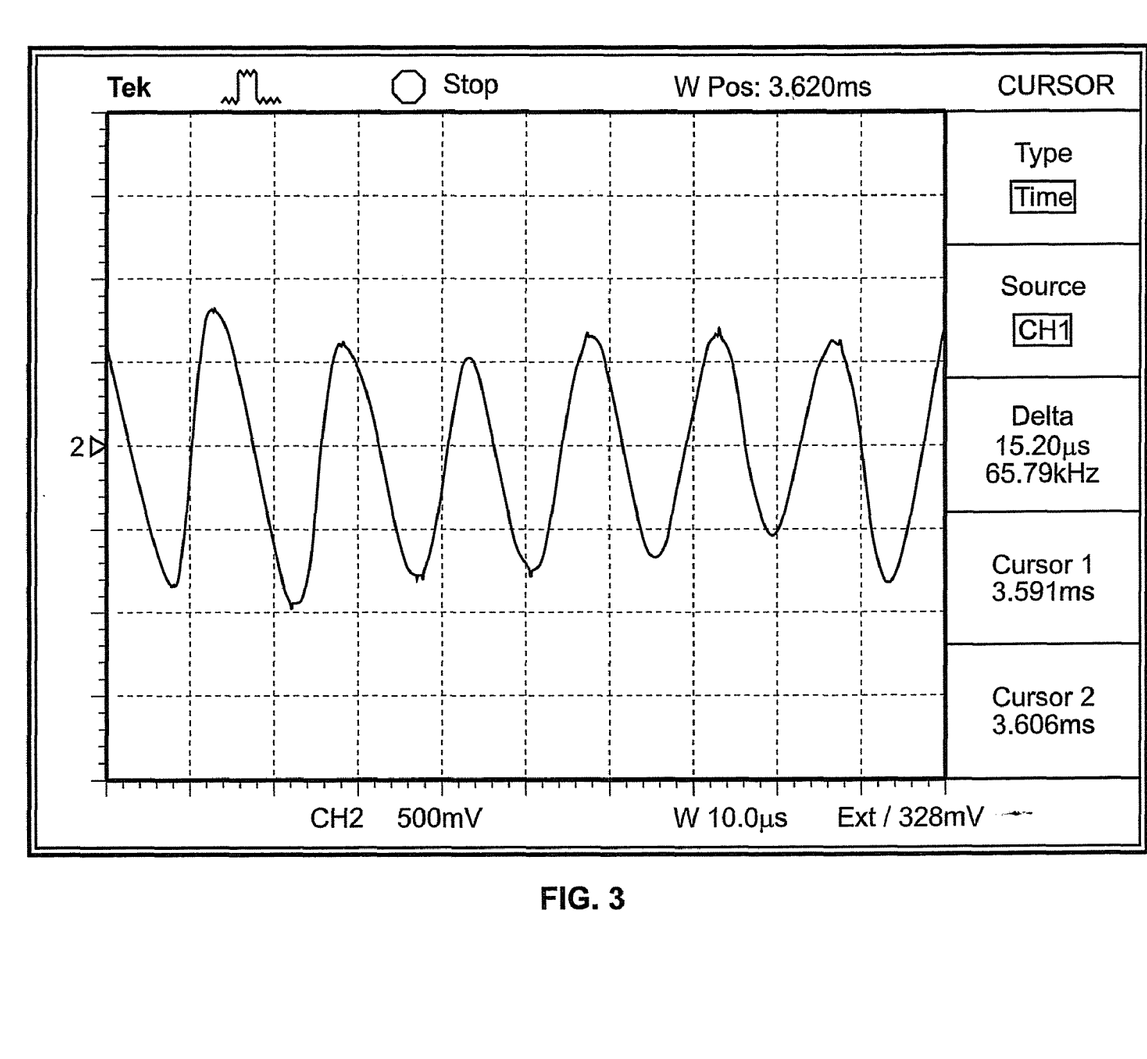
FIG. 3 is a display screen of a frequency measurement instrument showing the periodic nature of the noise in FIG. 2 of the 1st derivative of a signal detected by a laser barcode scanner.

Analysis of noisy signals generated by scanner units exhibiting reading errors revealed a never-before seen noise on the 1st derivative of the detected signal when a diffuse object such as a barcode is placed in the field of view (FOV) of the scanner. An example of the signal noise observed is illustrated in the instrument display screen shown in FIG. 2, where the full width of the signal between the positive and negative spikes represents one forward side-to-side sweep of the laser beam leaving the output window (about 48° in the test case shown). The noise is visible as the bulge of the signal slightly off the center of the middle vertical line to the right. The off-center nature of the noise was seen to follow the window, i.e. if the window was flipped left-to-right, the noise would flip to the other opposite side. However, if the output window was flipped vertically the noise would not move in position. The instrument display screen shown in FIG. 3 further reveals that the signal noise (with the time scale amplified in this screen) can be seen to be very periodic in nature. Because the signal noise completely disappeared when the output window was removed from the scanning unit, a lack of parallelism of the window front and rear surfaces was suspected.

A total of twenty (20) laser output window samples were measured to determine if the windows lacked parallelism between the front and rear window surfaces 12, 14 (see FIG. 1). These same windows were also subjected to noise testing and measurement as described above. Although the laser output windows 10 are intended and specified to have parallel front and rear surfaces 12, 14, it was discovered that these surfaces were not always perfectly parallel to each other in all cases due to dimensional manufacturing variances in thickness resulting from the window molding process. These variances in window thickness may be characterized as falling into the following two groups.

Figure 9:
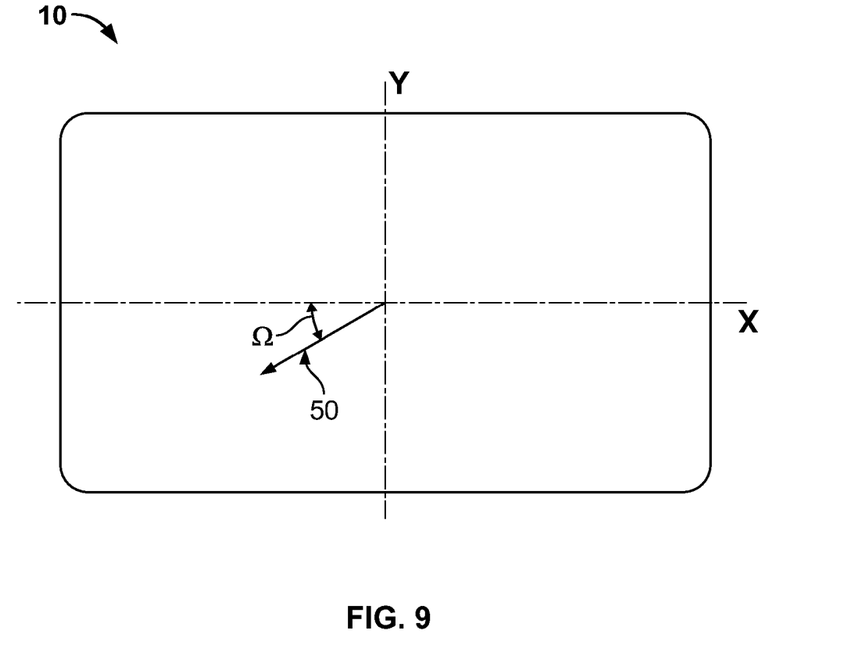
FIG. 9 is an exemplary side view of a laser output window having one type of thickness variation observed during testing of output window samples.
Figure 10:
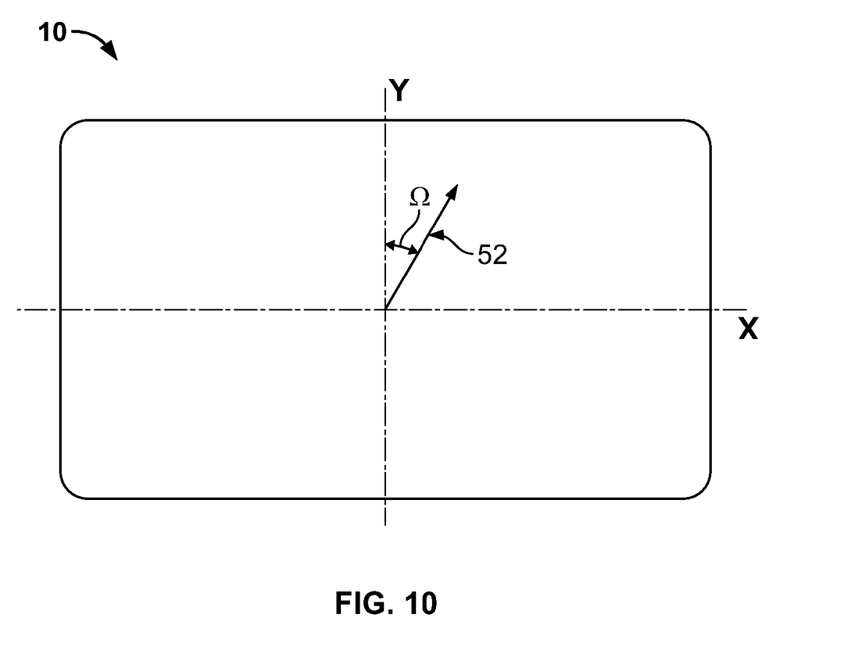
FIG. 10 is an exemplary side view of a laser output window having another type of thickness variation observed during testing of output window samples.

In the first group of window thickness variations (assuming for convenience of discussion that the laser output windows 10 are oriented vertically upright in the X-Y plane as shown in FIGS. 9 and 10), the manufacturing process had unintentionally introduced somewhat horizontally-extending wedge angles α (see, e.g. FIGS. 4 and 5 showing top views of output windows) between the front and rear surfaces 12, 14 of the windows that were oriented more in a lengthwise (or widthwise) direction of the window. These horizontally-extending wedge angles α were randomly oriented and not perfectly aligned parallel to or along either the X-axis or the Y-axis, and thus were oriented at various angles Ω oblique to both the X-axis and Y-axis of the output windows 10 as shown in FIG. 9. However, this first group of horizontally-extending wedge angles α were generally aligned closer to the X-axis than the Y-axis (see FIG. 9 and arrow 50 indicating direction of increasing thickness). Significantly, these windows were found to exhibit the undesirable 1st derivative signal noise. Although the wedge angles α were very small ranging from 0.017 to 0.049 degrees as measured, this was sufficient based on the test results to produce noise on the 1st derivative of the detected signal when a diffuse object such as a barcode is placed in the field of view (FOV) of the laser scanner.

A second group of thickness variations and wedge angles found in the output windows 10 test samples had more vertically-extending wedge angles α between the front and rear surfaces 12, 14 that were oriented more in a height-wise direction of the window. These more vertically-extending wedge angles α were randomly oriented also and not perfectly oriented or aligned parallel to either the X-axis or Y-axis, but instead were oriented at various angles Ω oblique to both the Y-axis and X-axis of the output windows 10 as shown in FIG. 10. However, this second group of wedge angles αv were aligned somewhat closer to the Y-axis than the X-axis (see FIG. 10 and arrow 52 indicating direction of increasing thickness). The magnitude of 1st derivative signal noise correlated with barcode missed decodes observed in this second group of height-wise wedge angles was less than the more horizontally-extending wedge angles, but not sufficient to reliably avoid the unwanted signal noise. Therefore, the investigation results indicated that the signal noise problem was greatest in laser output windows 10 having a more horizontally-oriented wedge angle α occurring in the lengthwise direction as shown in FIGS. 4 and 5. Accordingly, when the thickness variations of the output windows 10 approach a more horizontal or lengthwise orientation closer towards the X-axis, the 1st derivative signal noise problem is most acute as the laser beam is scanned across the output window.

Figure 6:
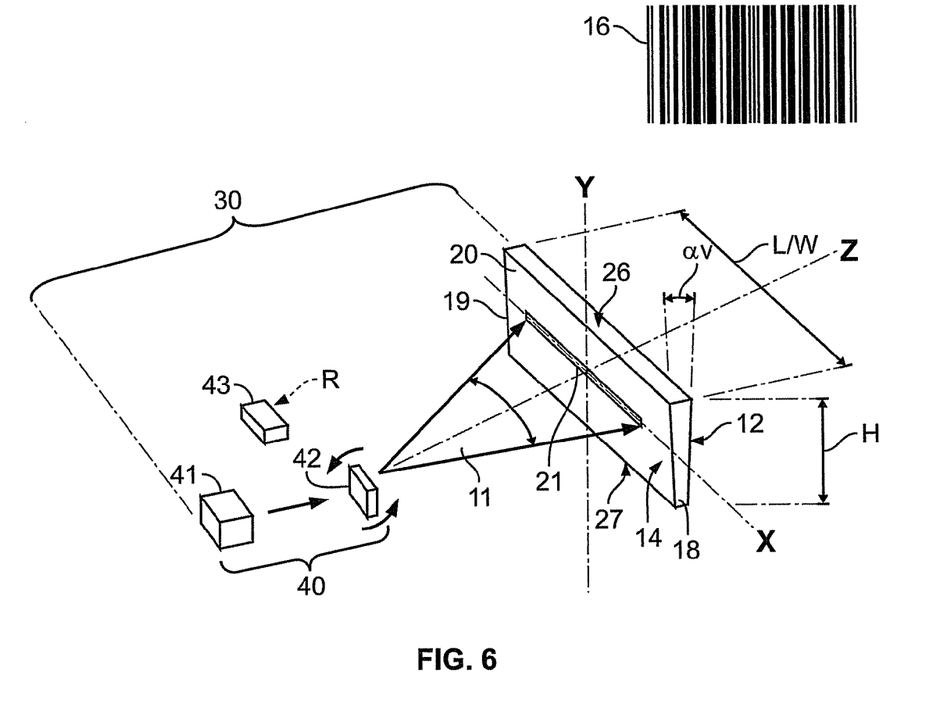
FIG. 6 is a perspective view of one embodiment of a laser output window and barcode scanner accordingly to the present invention.

It was further observed in the course of this investigation that the noise always occurs off-center, toward the thin side of the window (i.e. the right side in FIGS. 4 and 5). The reason for this is that the horizontally-extending wedge angle α on that side serves to tilt the second reflected laser beam 13' back toward the transmitted primary beam 11, albeit slightly. This tilt (exaggerated in FIG. 5), combined with the particular focal distance "df" of the primary scanning beam 11, results in the nearly precise overlap of the transmitted primary beam 11 and doubly-reflected beam 13' wavefronts at a specific critical angle of incidence "θc." As shown in FIG. 5, this near-perfect overlap of wavefronts (not irradiance profiles) creates interference regions I and just the right conditions for coherent interference between the primary beam 11 and second reflected beam 13' wherein the beams 11, 13' pulsate rapidly between constructive and destruction interference creating significant optical noise that causes barcode reading errors and which may result in actual power modulation of the outgoing laser beam. Referring to FIG. 5, the critical angle "θc" (for optimal interference) is given by the equation:

$$\theta c = \alpha n^2 d_f / t_{nom} \quad \text{Eq. (1)}$$

where "$t_{nom}$" is nominal thickness of window 10, "n" is refractive index of window 10, "$d_f$" is focal distance of the primary beam 11, and "α" is the wedge angle. The critical angle θc is the primary laser beam 11 angle of incidence θ wherein the focal points Fp and Fr of both the transmitted primary laser beam 11 and second reflected beam 13' respectively will converge and overlap in three dimensions to meet at approximately the same location or point in space defining a dual or overlapping focal point F, as shown in FIG. 5. This example assumes that the vertical wedge angle in the heightwise direction between the front and rear window surfaces 12, 14 as further described herein is approximately zero (i.e. surfaces 12 and 14 are vertically spaced apart from top to bottom by approximately the same distance at a given horizontal location or position along the length of the output window 10). This overlapping or dual focal point F of both the primary and second reflected laser beams 11, 13' thus occurs at the same three dimensional location (i.e. approximately at the same X-axis, Y-axis, and Z-axis coordinates illustrated in FIG. 6) wherein the undesired signal noise is created causing barcode decoding errors. The overlapping focal point F coincides with the optimum focal distance $d_f$ of a barcode target 16 from the laser output window 10 for reading the barcode. For completeness, as shown in FIG. 5, it is worth mentioning that an overlapping reflected foci of the primary laser beam 11 and first reflected laser beam 13 is formed rearward of rear surface 14.

Preferred Embodiments

Based on the foregoing testing, a laser output window is provided herein that avoids formation of the foregoing overlapping focal point F of the primary and second reflected laser beams 11, 13', thereby eliminating or minimizing the 1st derivative signal noise problem. In one embodiment according to the present invention shown in FIGS. 6 and 8, this is achieved by intentionally introducing a small controlled vertical wedge angle αv in the height-wise direction of laser output window 20 during manufacture that preferably is aligned perpendicular to the direction of the horizontal scanning line 21 of the laser beam on the window. The vertical wedge angle αv therefore is preferably further aligned in this embodiment to be substantially parallel to Y-axis (+/−allowance for fabrication tolerances), in contrast to the generally random wedge angles unintentionally introduced by the manufacturing process that were detected in the laser output window testing described herein. The thickness of the laser output window 20 according to the present invention is carefully controlled during manufacture to thus gradually increase in a vertical direction substantially parallel to the Y-axis.

Figure 8:
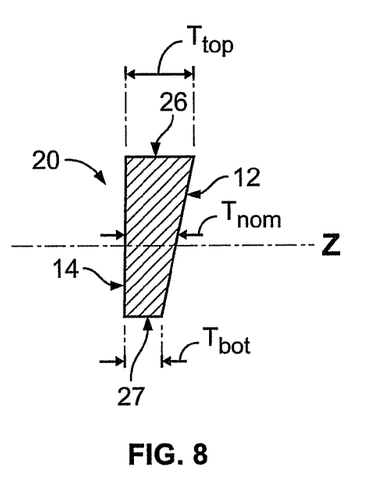
FIG. 8 is a cross-sectional side view taken through the laser output window of FIG. 6.

It should be noted that laser output window 20 shown in FIGS. 6 and 8 has been described for convenience with reference to a coordinate system having an X-axis, Y-axis, and Z-axis as shown in FIG. 6, with the X-axis being associated with a horizontal scanning line wherein the laser beam of the scanner is scanned or oscillated back and forth across the output window. Although these coordinates are used in describing laser output window 20 if held in a vertical orientation, it will be appreciated that the laser output window may be oriented in any direction as typically encountered with both stationary/fixed and hand-held scanner housings when in use scanning barcodes.

It should be further noted that although FIG. 5 is a two-dimensional representation of the primary laser beam 11 and second reflected laser beam 13', it will be appreciated as described elsewhere herein that it is necessary that the wavefronts of the primary and second reflected laser beams 11, 13' match one another reasonably well in three-dimensional space for their respective focal points Fp and Fr to converge at overlapping focal point F that induces the noise problem. Accordingly, a misalignment of beams 11 and 13' in at least one of the three dimensions (e.g. X-axis, Y-axis, or Z-axis) is sufficient to avoid convergence of the focal points Fp, Fr of the primary and second reflected laser beams 11, 13' respectively at an overlapping focal point F necessary to produce the unwanted signal noise. Although in some instances the primary and second reflected laser beams 11, 13' may still overlap to some degree closer to output window 20 resulting in the creation of interference regions between the beams as shown in FIG. 5, this interference pattern will be a relatively high-frequency fringe pattern that is readily averaged out spatially on the photodiode to avoid the unwanted signal noise and barcode missed decodes.

The preferred sizing of vertical wedge angle $\alpha v$ will now be described. According to one embodiment of a laser scanner output window 20 shown in FIGS. 6 and 8, a sufficiently large controlled vertical wedge angle $\alpha v$ is provided to avoid the 1st derivative signal noise problem. It is preferable to have a concise equation for determining what vertical wedge angle $\alpha v$ should be introduced in the vertical or height-wise dimension of the laser output window 20 in order to avoid the noise problem. If foregoing Eq. (1) is solved for the wedge angle $\alpha$, the following formula results:

$$\alpha = \frac{\theta_c t_{nom}}{n^2 d_f} \quad \text{Eq. (2)}$$

With wedge in the vertical direction, the most likely occurrence of noise will be near the center of sweep, where the incidence angle of the laser beam on the output window is the smallest. Typically in a barcode scanner, the output window is tilted slightly when mounted to the scanner housing to avoid direct specular reflection back into the scanner which would saturate the light-collecting photodiode. At that point the angle of incidence will be equal to the tilt angle $\theta_t$ of the window with respect to the path of the primary laser beam and the scanner housing. It should be noted that this tilt angle $\theta_t$ relates to the angle at which the output window is mounted to the scanner housing and hence the beam path as opposed to the wedge angle $\alpha$ in the window itself. If this tilt angle $\theta_t$ of the output window is substituted for the critical angle $\theta c$ in Eq. (2), a critical wedge angle $\alpha$ may be calculated as follows. To avoid the 1st derivative signal noise, therefore, we want the actual vertical wedge angle $\alpha v$ to be greater than the critical wedge angle $\alpha$ by some amount. In one embodiment, a factor of 4 may be used to avoid the undesired signal noise, so we find the following criterion:

$$\alpha > \frac{4\theta_t t_{nom}}{n^2 d_f} \quad \text{Eq. (3)}$$

Since refractive index is not always precisely known, but it is often about 1.5, a substitution and further rounding results in the simpler formula of:

$$\alpha > \frac{2\theta_t t_{nom}}{d_f} \quad \text{Eq. (4)}$$

In one embodiment, with an output window tilt angle $\theta_t$ is about 8°, a thickness $t_{nom}$ of about 1.75 mm, and a focus distance $d_f$ of about 97 mm from the window, a minimum vertical wedge angle $\alpha v$ of about 0.3° will therefore avoid the unwanted 1st derivative signal noise. A vertical wedge angle $\alpha v$ of about 0.3° or larger will produce a repetitive fringe pattern on the barcode object with a spacing of only 41 µm. Even with moderate magnification by the collection optics, such a disturbance is easily averaged out by a 2.65 mm square photodiode to avoid the 1st derivative signal noise. Furthermore, introducing such a small, but effective vertical wedge angle $\alpha v$ into the output window will typically have no significant effect on the field of view (FOV) of the laser scanning line 21 (shown in FIG. 6) that is ultimately projected onto a barcode 16.

Figure 7:
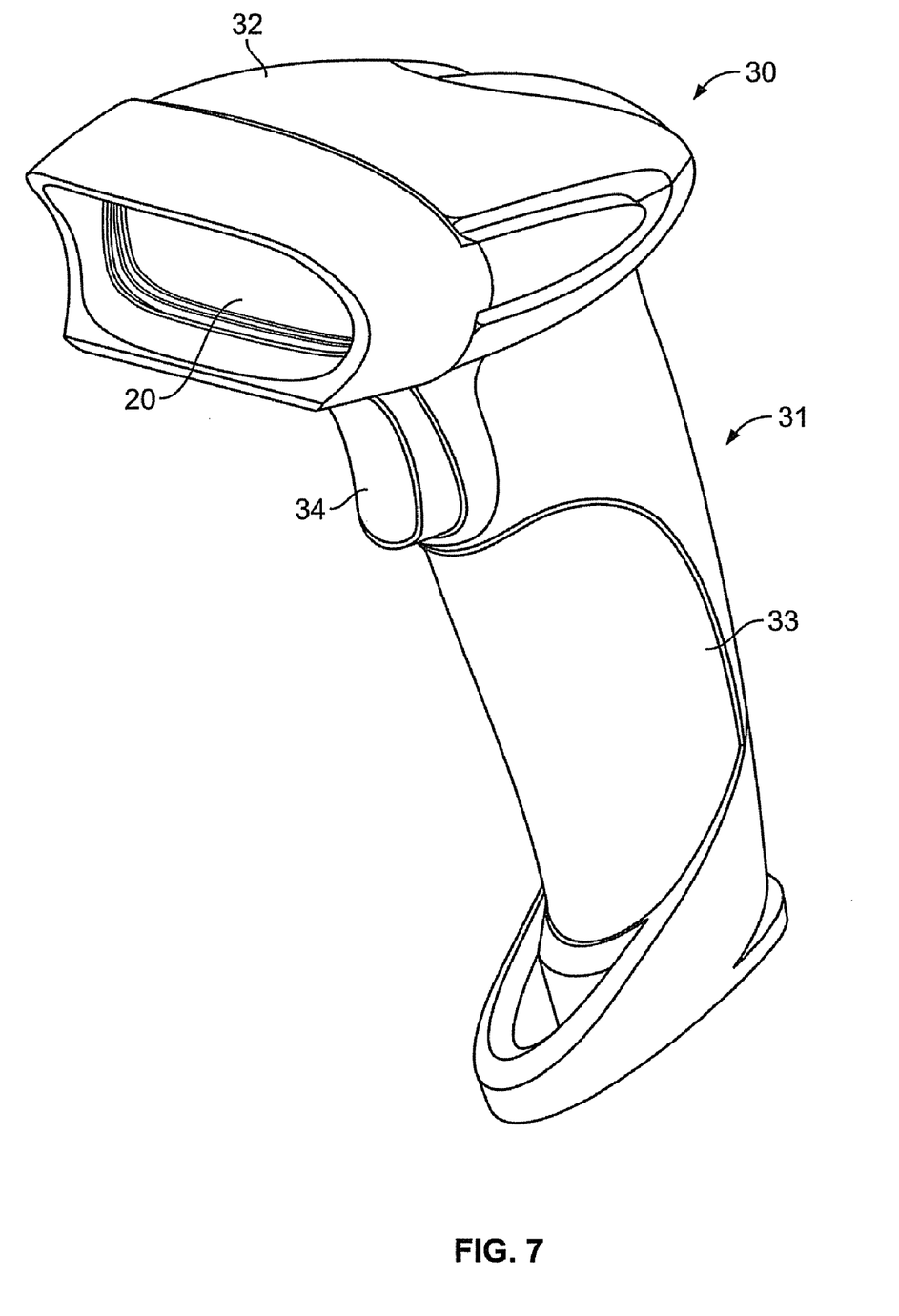
FIG. 7 is a perspective view of one possible physical embodiment of a handheld laser barcode scanner incorporating the laser output window of FIG. 6.

Referring to FIGS. 6 and 8, a flying spot scanner according to the present invention, which may be a portable handheld scanner 30 in one possible embodiment as shown in FIG. 7, includes a conventional housing 31 having an upper portion 32 and a lower handle portion 33 for holding the scanner. Housing 31 defines an internal cavity (not shown) that houses conventional scanner system electronics and control circuitry, including circuitry for detecting light reflected from a symbology target, processing the corresponding electrical signals generated therefrom, and decoding the symbology. One example of such circuitry without limitation is described in U.S. Pat. No. 7,431,215 which is incorporated herein by reference in its entirety. Lower handle portion 33 includes a conventional trigger mechanism 34 operative to actuate the laser beam generation and decoding circuitry for reading a barcode target 16. Upper portion 32 houses inside a main printed circuit board (PCB) 40 which defines an optical bench for supporting a conventional photodetector 43 that receives reflected light R from the barcode target 16, a conventional laser source or generator such as a solid state visible laser diode 41 (VLD), and a conventional means for scanning the primary laser beam 11 back and forth across the output window 20 and in turn the scan field as the beam is transmitted through window.

In some embodiments, the means for scanning the laser beam may include without limitation an oscillating flipper mechanism 42 as shown, mirrored rotating scanning prism or polygon, holographic projector, or other suitable conventional means known in the art. Some exemplary conventional flipper mechanisms are described in U.S. Pat. No. 6,439,461 and patents identified therein, all of which are incorporated by reference in their entireties. Some exemplary conventional rotating polygons are described in U.S. Pat. Nos. 7,431,215, 4,971,410, and 5,196,696, all of which are incorporate herein by reference in their entireties. Flipper mechanism 42, diagrammatically represented in FIG. 6, may include one or more mirrors arranged in various orientations to direct and bend the primary laser beam 11 in different directions and ultimately outwards from scanner 30 towards the symbology or barcode target 16 to be scanned in the scan field. At least one of the mirrors of flipper mechanism 42 is configured and adapted to repetitively oscillate about an axis at a predetermined frequency by an oscillating means which scans the laser beam back and forth across the laser output window 20 and barcode target 16. In some embodiments, the means for oscillating the mirror may be for example a stepper motor which may be driven by a standard driver circuit or any other suitable conventional mechanism commonly used in the art for oscillating scanner mirrors.

Referring to FIGS. 6-8, laser output lens or window 20 according to the present invention is attached to and supported by upper housing portion 32 as best shown in FIG. 7. In one embodiment, laser output window may be elongated having a length L or width W (measured along the X-axis in the direction of scanning line 21) that is larger than its height H (measured along the Y-axis perpendicular to the X-axis and scanning line 21). In other embodiments, such as shown in U.S. Pat. No. 7,431,215 incorporated herein by reference in its entirety, output window 20 may have a length L or width W that is substantially equal to the height H of the window. Output window 20 includes two ends 18, 19 shown in FIG. 6, with the distance therebetween defining the length L or width W.

With continuing reference to FIGS. 6-8, laser output window 20 includes a rear surface 14 facing towards the interior of scanner 30 and a front surface 12 facing outwards from the exterior of the scanner. Preferably, rear surface 14 is configured and positioned such that primary laser beam 11 may be scanned across the length or width of output window 20 thereby defining a laser scanning line 21 on the rear surface of the window. Laser scanning line 21 is therefore preferably oriented to extend across the length or width of output window 20 along the X-axis as shown in FIG. 6. In one embodiment, laser beam 11 is projected onto output window 20 by the flipper mechanism 42 and any other associated optical components such that laser scanning line 21 is oriented and aligned horizontally along the length of the window 20 as shown in FIG. 6. The laser scanning line 21 is projected through output window 20 and outwards from scanner 30 towards the barcode target 16.

Referring to FIGS. 6 and 8, front and rear surfaces 12, 14 of laser output window 20 are inclined at a vertical wedge angle αv to each other in the Y-Z plane as described elsewhere herein. Output window 20 is fabricated in a controlled manner such that the thickness gradually increases or decreases in the height-wise direction of laser output window 20 and which thickness increase or decrease is aligned parallel to Y-axis and perpendicular to the direction of the horizontal scanning line 21 of the laser beam on the window This is distinguishable from the randomly occurring wedge angles observed in the test window samples described above that were oblique to the Y-axis, and hence not perpendicular to the X-axis or scanning line 21 thereby not completely and reliably eliminating the unwanted signal noise. In one possible embodiment, the spacing or distance between front and rear surfaces 12, 14 (i.e. thickness) is greater at top 26 than bottom 27 of window 20. In other embodiments, the opposite arrangement may be provided wherein the spacing or distance between front and rear surfaces 12, 14 is greater at the bottom 27 than the top 26 of window 20. Window 20 thus defines a top thickness Ttop at top 26, a bottom thickness Tbot at bottom 27, and a nominal thickness Tnom as best shown in FIG. 8. According to a preferred embodiment, therefore, the top thickness Ttop and bottom thickness Tbot are preferably different, with one of the thicknesses being less than the other. The nominal thickness Tnom falls between the measured values of the top and bottom thicknesses Ttop and Tbot, respectively. In one embodiment, the top thickness Ttop and bottom thickness Tbot preferably is substantially uniform in measurement along the majority of the length L or width W of output window 20, and more preferably along substantially the entire length L or width W of the window (with an allowance for standard manufacturing tolerances depending on the process used to fabricate the window). Accordingly, in some embodiments, the controlled vertical wedge angle αv is preferably substantially uniform along the entire length L or width W of laser output window 20 with some allowance for standard manufacturing tolerances depending on the process used to fabricate the windows. It should be noted that as defined herein, thicknesses Ttop, Tbot, and Tnom are measured in the direction of the Z-axis and perpendicular to the X-axis and Y-axis.

Referring to FIGS. 6 and 8, laser output window 20 is made of an optically transparent material, which in some embodiments may be a commercially-available plastic or glass material commonly used in the art for laser scanners. In one embodiment, output window 20 is preferably made by a molding process such as a conventional injection molding process.

Laser output window 20 may be substantially planar or flat in some preferred embodiments such that both front and rear surfaces 12, 14 are flat, as shown in FIGS. 6 and 8. It will be appreciated that in other embodiments, however, laser output window 20 may be arcuately curved or arc-shaped along its length L (not shown) as used in some commercial laser scanners such as the Metrologic Voyager series of barcode scanners available from Honeywell Scanning & Mobility of Blackwood, N.J. Window 20 may therefore be curved in the X-Z plane with respect to the X-axis (see coordinates shown in FIG. 6), with front and/or rear surfaces 12, 14 being curved. Under certain geometric conditions, i such longitudinally-curved laser output windows may also be susceptible to the same noise on the 1st derivative signal discussed herein. Accordingly, the present invention may beneficially be applied to curved laser output windows also to avoid signal noise. The present invention, therefore, is not limited to longitudinally straight output windows.

For convenience of reference, the laser output window 20 according to the present invention has been described with orientations described as horizontal and vertical, and with reference to an X, Y, and Z-axis coordinate system. It will be appreciated, however, that particularly in the case of a hand-held laser barcode scanner, the scanner may be rotated and used by a user at a multitude of varying angles to horizontal between 0 and 180 degrees when reading a barcode on an object. Accordingly, the invention is expressly not limited to the arbitrary orientations defined by the X, Y, and Z-axis used herein for convenience.

While the foregoing description and drawings represent preferred or exemplary embodiments of the present invention, it will be understood that various additions, modifications and substitutions may be made therein without departing from the spirit and scope of the present invention as defined in the accompanying claims. In particular, it will be clear to those skilled in the art that the present invention may be embodied in other specific forms, structures, arrangements, proportions, sizes, and with other elements, materials, and components, without departing from the spirit or essential characteristics thereof. One skilled in the art will appreciate that the invention may be used with many modifications of structure, arrangement, proportions, sizes, materials, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being defined by the appended claims, and not limited to the foregoing description or embodiments. Rather, the appended claims should be construed broadly, to include other variants and embodiments of the invention, which may be made by those skilled in the art without departing from the scope and range of equivalents of the invention.

What is claimed is:

1. A laser scanner for reading a symbol target, comprising:
a housing;

a laser generator disposed in the housing and operative to generate a laser beam that is focused to a focal distance $d_f$;

an output window supported by said housing and being positioned to receive the laser beam at an output window tilt angle $\theta_t$;

a scanning mechanism for scanning said laser beam through and across a scanning region of said output window having a nominal thickness $t_{nom}$, and across a scanning field defined external to said housing where a symbol target is present within said scanning field; and a photodetector for detecting the intensity of light energy from said laser beam as said laser beam is scanned through said output window, reflected and/or scattered off said symbol target, and collected by light collection optics and focused onto said photodetector during laser beam scanning operations;

wherein said output window has front and rear surfaces and vertical and horizontal axes, and is optically transparent to allow said laser beam to be transmitted through said output window and towards said symbol target within said scanning field;

wherein said output window includes a small vertical wedge angle, $\alpha$, between the front and rear surfaces of said output window;

wherein said small vertical wedge angle is oriented substantially parallel to the vertical axis, aligned perpendicular to the direction of scanning of said laser beam through said output window, and is approximated by the equation:

$$\alpha > \frac{2\theta_t t_{nom}}{d_f}$$

wherein $\theta_t$ is said output window tilt angle defined between the normal to the surface of said output window and said laser beam being directed from said laser beam generator through and across the scanning region of said output window;

wherein $t_{nom}$ is the nominal thickness of said output window across said scanning region;

$d_f$ is the focus distance of said laser beam measured from said output window; and wherein said small vertical wedge angle (a) is generally less than 1 degree, (b) does not significantly modify the direction of propagation of said laser beam as said laser beam is scanned across said scanning region of said output window, and (c) significantly reduces the power level of signal noise at said photodetector, by eliminating optimum interference conditions between the following laser beam components within the scanning region of said output window:

(i) the laser beam incident upon and transmitted through said output window; and (ii) the reflected laser beam reflecting off of the front and rear surfaces of said output window and transmitted out into said scanning field.

2. The laser scanner of claim 1, wherein said small vertical wedge angle is substantially the same along an entire length or width of said output window.

3. The laser scanner of claim 1, wherein said small vertical wedge angle is at least about 0.3 degrees.

4. The laser scanner of claim 1, wherein said front surface is spaced farther apart from said rear surface at either a top or a bottom of the window.

5. The laser scanner of claim 1, wherein said output window has a top thickness and a bottom thickness different than the top thickness.

6. The laser scanner of claim 5, wherein the top thickness and bottom thickness are each uniform along substantially an entire length or width of said output window.

7. The laser scanner of claim 1, wherein said scanning mechanism scans said laser beam across the rear surface of said output window to define a horizontally-extending scanning line across the scanning region of said output window, while said small vertical wedge angle is oriented in a direction substantially perpendicular to said horizontally-extending scanning line.

8. The laser scanner of claim 7, wherein said small vertical wedge angle is uniform along substantially the entire portion of said horizontally-extending scanning line.

9. The laser scanner of claim 1, wherein said scanning mechanism is selected from the group consisting of an oscillating flipper mechanism, a rotating scanning polygon with mirrored surfaces, and a holographic projector.

10. A method of scanning a symbol target using a laser beam produced from a laser scanner while significantly reducing the power level of signal noise in said laser scanner, said method comprising the steps of:

(a) providing said laser scanner having the following components;

a housing;

a laser generator disposed in the housing and operative to generate a laser beam that is focused to a focal distance $d_f$;

an output window supported by said housing and being positioned to receive the laser beam at an output window tilt angle $\theta_t$;

a scanning mechanism for scanning said laser beam through and across a scanning region of said output window having a nominal thickness $t_{nom}$, and across a scanning field defined external to said housing where a symbol target is present within said scanning field; and a photodetector for detecting the intensity of light energy from said laser beam as said laser beam is scanned through said output window, reflected and/or scattered off said symbol target, and collected by light collection optics and focused onto said photodetector during laser beam scanning operations;

wherein said output window has front and rear surfaces and vertical and horizontal axes, and is optically transparent to allow said laser beam to be transmitted through said output window and towards at said symbol target within said scanning field;

wherein said output window includes a small vertical wedge angle, a, between the front and rear surfaces of said output window;

wherein said small vertical wedge angle is oriented substantially parallel to the vertical axis, aligned perpendicular to the direction of scanning of said laser beam through said output window, and is approximated by the equation:

$$\alpha > \frac{2\theta_t t_{nom}}{d_f}$$

wherein $\theta_t$ is said output window tilt angle defined between the surface of said output window and said laser beam being directed from said laser beam generator through and across the scanning region of said output window;

wherein $t_{nom}$ is the nominal thickness of said output window across said scanning region;

wherein $d_f$ is the focus distance of said laser beam measured from said output window;

wherein said small vertical wedge angle (a) is generally less than 1 degree;

(b) said laser generator generating said laser beam that is focused to a focal distance $d_f$ from said window;

(c) said scanning mechanism scanning said laser beam across said output window along said scanning direction and said scanning field, without said small vertical wedge angle significantly modifying the direction of propagation of said laser beam across said scanning field;

(d) said photodetector detecting the intensity of light energy from said laser beam as said laser beam is scanned through said output window, reflected and/or scattered off a symbol target, and collected by light collection optics and focused onto said photodetector during laser beam scanning operations;

(e) during steps (b), (c) and (d) above, said small vertical wedge angle significantly reducing the power level of signal noise at said photodetector, by eliminating optimum interference conditions between the following laser beam components within the scanning region of said output window:

(i) the laser beam incident upon and transmitted through said output window and into the scanning field; and (ii) the reflected laser beam reflecting off of the front and rear surfaces of said output window and transmitted out into said scanning field.

11. The method of claim 10, wherein said small vertical wedge angle is substantially the same along an entire length or width of said output window.

12. The method of claim 11, wherein said output window has a top thickness and a bottom thickness different than the top thickness.

13. The method of claim 12, wherein the top thickness and bottom thickness are each uniform along substantially an entire length or width of said output window.

14. The method of claim 10, wherein said small vertical wedge angle is at least about 0.3 degrees.

15. The method of claim 10, wherein said front surface is spaced farther apart from said rear surface at either a top or a bottom of the window.

16. The method of claim 10, wherein said scanning mechanism scans said laser beam across the rear surface of said output window to define a horizontally-extending scanning line across the scanning region of said output window, while said small vertical wedge angle is oriented in a direction substantially perpendicular to said horizontally-extending scanning line.

17. The method of claim 16, wherein said small vertical wedge angle is uniform along substantially the entire portion of said horizontally-extending scanning line.

18. The method of claim 10, wherein said scanning mechanism is selected from the group consisting of an oscillating flipper mechanism, a rotating scanning polygon with mirrored surfaces, and a holographic projector.

* * * * *